United States Patent [19]

Butenop

[11] Patent Number: 4,619,418
[45] Date of Patent: Oct. 28, 1986

[54] SELF-LOCKING BELT REEL-IN MECHANISM FOR SAFETY BELTS

[75] Inventor: Klaus Butenop, Herzhorn, Fed. Rep. of Germany

[73] Assignee: Autoflug GmbH, Rellingen, Fed. Rep. of Germany

[21] Appl. No.: 716,035

[22] Filed: Mar. 26, 1985

[30] Foreign Application Priority Data

Mar. 26, 1984 [DE]  Fed. Rep. of Germany ....... 3411067

[51] Int. Cl.⁴ ...................... B60R 22/38; B60R 22/40
[52] U.S. Cl. ...................... 242/107.4 A; 242/107.4 B; 242/107.4 C
[58] Field of Search ................. 242/107.4 A, 107.4 B, 242/107.4 C; 280/806; 297/478

[56] References Cited

U.S. PATENT DOCUMENTS

| | | | |
|---|---|---|---|
| 4,497,458 | 2/1985 | Gueguen et al. | 242/107.4 B |
| 4,506,844 | 3/1985 | Ernst | 242/107.4 A |
| 4,508,289 | 4/1985 | Singer et al. | 242/107.4 B |
| 4,509,707 | 4/1985 | Ernst et al. | 242/107.4 A |

FOREIGN PATENT DOCUMENTS

| | | | |
|---|---|---|---|
| 2454310 | 12/1980 | France | 242/107.4 B |
| 2090119 | 7/1982 | United Kingdom | 242/107.4 B |

*Primary Examiner*—John M. Jillions
*Attorney, Agent, or Firm*—Becker & Becker, Inc.

[57] ABSTRACT

A self-locking belt reel-in mechanism for safety belts, especially of motor vehicles, including a housing and a belt reeling-in shaft mounted therein so that it cannot be displaced axially, but can be displaced radially under the effect of locking forces. The shaft can be arrested at both ends in toothings secured to the housing. The mechanism is accommodated in relatively narrow structural parts of the vehicle, such as the B-columns; thus, overall size is no problem. Furthermore, the load is to act uniformly upon the shaft in the event of high-load (a crash). In contrast, for normal operation it is only necessary to arrest one end of the shaft. One of the arresting arrangements is in the form of a locking member disposed in a recessed portion in the associated end of the belt reeling-in shaft. The depth of the recessed portion is such that the locking member is flush relative to the plane of the associated opening of the housing. The locking member is pivotably mounted eccentrically relative to the axis of the belt reeling-in shaft and is provided with tooth-like latching projections. The other arresting arrangement has a peripheral toothing flush with the plane of the associated opening of the housing. The recessed portion can have a resilient abutment for the locking member. Furthermore, the mounting of the belt reeling-in shaft can be effected via resilient bearing cups.

11 Claims, 5 Drawing Figures

SELF-LOCKING BELT REEL-IN MECHANISM FOR SAFETY BELTS

BACKGROUND OF THE INVENTION

1. Field of the Invention

The present invention relates to a self-locking belt reel-in mechanism for safety belts, especially of automobiles or other motor vehicles; the mechanism has a housing, and a belt reeling-in shaft which is mounted therein in such a way that it cannot be displaced axially, but can be displaced radially under the effect of locking forces; the ends of the belt reeling-in shaft extend through openings of the housing, and are each provided, in the plane of its opening, with an arrangement which provides for arresting the belt reeling-in shaft; one of these arresting arrangements engages a fixed internal toothing of one of the openings when locking forces occur which do not exceed a predetermined value, and when locking forces occur which exceed the previously mentioned locking forces, both arrangements engage fixed internal toothings of both of the openings, so that arresting, and hence locking, of the belt reeling-in shaft results either at one end or at both ends of the latter.

2. Description of the Prior Art

One known belt reel-in mechanism of this general type (according to U.S. Pat. No. 4,509,707 Ernst et al. issued Apr. 9, 1985 and belonging to the Assignee of the present invention) discloses a two-sided locking of the shaft; locking is differentiated for basically two different load situations, namely the so-called normal situation and the so-called crash situation. If the belt strap force does not exceed a standard value, as occurs, for example, when the vehicle is braked in an everyday traffic situation, the locking action of a locking member disposed on one side of the belt reeling-in shaft suffices in order to restrain the safety belt and the person who is strapped in. However, if far greater belt strap forces which exceed the normal occur during a collision or the like, after the locking member has caught, such great tension forces, and therefrom radial forces acting on the shaft or on the winding, become effective that they shift the shaft as a whole radially and thereby also cause engagement of the arresting mechanism at the other end of the shaft. With the heretofore known belt reel-in mechanism, the locking member comprises a member which is mounted in a recess of the associated opening in the housing, and can be pivoted into the toothing of a toothed wheel which is aligned therewith, with an actuating element in the form of a pin, which is controlled by the self-locking mechanism, being disposed on the member. Thus, the member fulfills a double function, because on the one hand it is in itself a locking element for the normal load situation, and on the other hand during an accident brings about an additional locking in that it effects the deflection of the shaft and hence its two-sided locking by engagement of the two-sided toothed wheel into the internal toothing of the openings of the housing. In this arrangement, the toothing of the opening on that side of the housing facing the member can be limited to a sector of the periphery, and the belt reeling-in shaft can be mounted externally of the housing on lateral housing covers (see also U.S. Pat. No. 4,223,853 Ernst issued Sept. 23, 1980 which also belongs to the Assignee of the present invention).

With the previously described known belt reel-in mechanism, a so-called thrust ring for absorbing load is not required, since the walls of the housing are functionally utilized for this purpose. A somewhat similar situation also exists with a further known belt reel-in mechanism (German Offenlegungsschrift No. 26 46 238), according to which a respective toothed wheel is disposed at both ends of the belt reeling-in shaft; corresponding inner toothings in the openings of the housing are associated with these toothed wheels. The effect connected with this is that the shaft, which shifts radially in the housing when locking forces occur, can be supported on both sides of the housing, and that accordingly the housing is loaded symmetrically and essentially free of distortion. As a result, the walls of the generally U-shaped housing can be lighter in weight, and a smaller structural width of the belt reel-in mechanism is also provided. To mount the shaft, the latter has, on both ends, shaft journals which are resiliently supported in radial direction in associated bearings. This resilient mounting is a portion of the belt-strap-sensitive locking mechanism which responds during accelerated withdrawal of the belt strap. Due to the dependence of the accelerations which occur relative to the size of the belt strap winding, the ratio of the radial forces required for the locking to the effective spring forces at the bearings of the shaft are not constant, and therefore no exactly definable locking can be achieved with this known belt-locking mechanism.

An aligned arrangement of the toothed wheels in the openings of the sides of the housing is also provided by a known belt reel-in mechanism disclosed in German Offenlegungsschrift No. 28 32 160, while in German Offenlegungsschrift No. 31 20 379, although it discloses a belt reel-in mechanism having two-sided locking and a shaft which can be shifted transversely for this purpose, the two-sided toothed wheels are, in this case, not disposed in openings of the housing, but rather are disposed within the sides of the housing, and the arresting is effected against inwardly flanged housing tangs, so that at any given time only one tooth of the toothed wheels can be effective. A principally similar situation results from German Offenlegungsschrift Nos. disclosures 15 31 545 and 15 31 546, and also from U.S. Pat. No. 3,695,545 Peters dated Oct. 3, 1972. Great Britian Pat. No. 14 28 111, and U.S. Pat. No. 3,876,164 Dully dated Apr. 8, 1975 are also relevant in this respect, while the subject matter of U.S Pat. No. 3,074,761—Ryan dated Jan. 22, 1963, entitled Safety Seat Belt, Janguart dated May 15, 1962 provides for an arresting with three teeth when the belt reeling-in shaft is shifted radially by virtue of pulling of the belt strap.

An object of the present invention is to provide a self-locking belt reel-in mechanism of the aforementioned general type, which is designed for two fundamentally different locking situations, namely for locking in the everyday "normal operation" on the one hand, and for locking in the high-load situation (crash) on the other hand. During normal operation, the belt reel-in mechanism should operate with few moving parts, should be able to be constructed small and if possible symmetrically, and should be able to be produced at low cost.

BRIEF DESCRIPTION OF THE DRAWINGS

These objects, and other objects and advantages of the present invention, shall appear more clearly from the following specification in conjunction with the embodiment illustrated in the drawings, in which.

SUMMARY OF THE INVENTION

Figure 1:
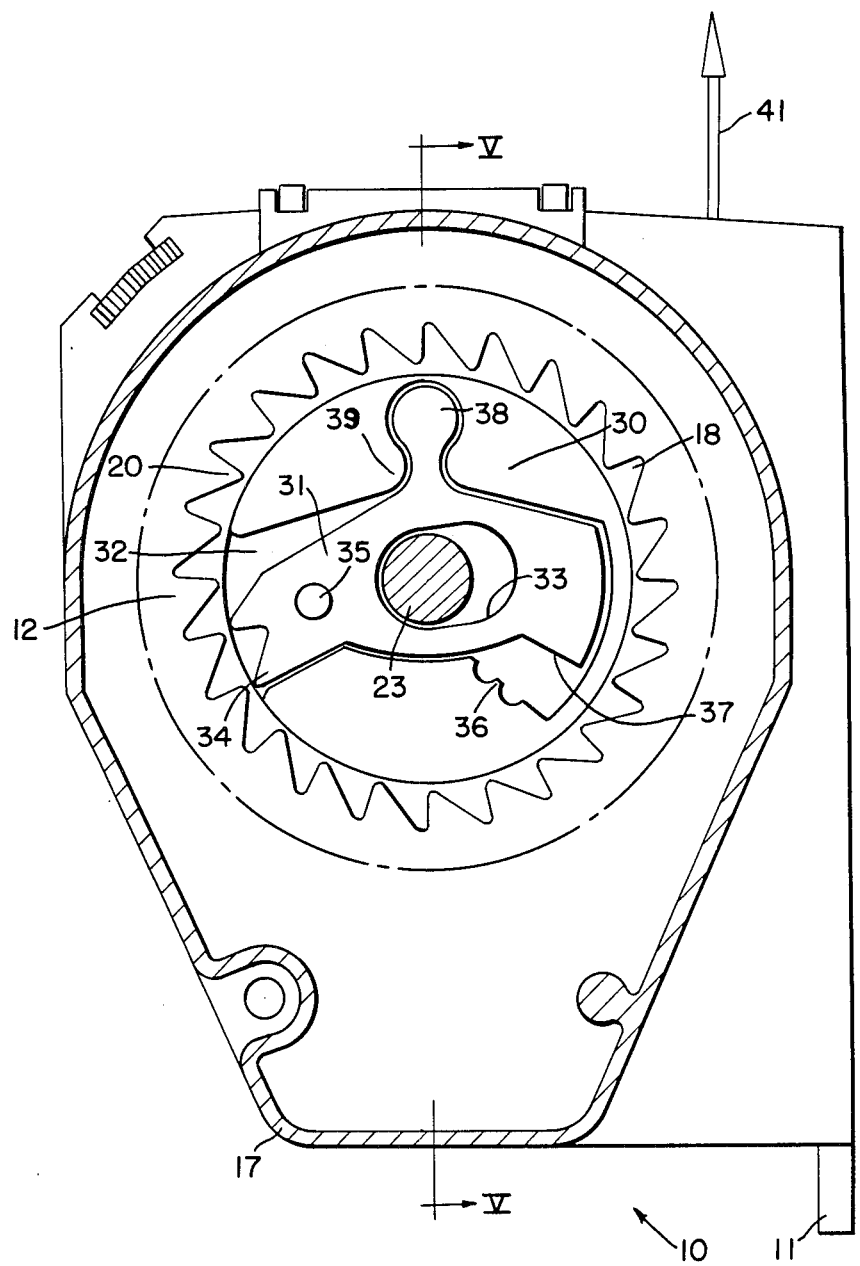
FIG. 1 is a cross-sectional view through a belt reel-in mechanism for safety belts and is taken along the line 1—I in FIG. 5, with the locking member being in the rest position.

The belt reel-in mechanism of the present invention is characertized primarily in that one of the arresting arrangements is in the form of a locking member which is disposed in an appropriate recessed portion in the associated end of the belt reeling-in shaft; the depth of the recessed portion is such that the locking member is flush relative to the plane of the associated opening of the housing; the locking member is pivotably mounted in the recessed portion, is eccentrical relative to the belt reeling-in shaft, and is provided with in particular toothlike latching projections; and in that the other arresting arrangement is in the form of a peripheral toothing which is flush with the plane of the associated opening of the housing.

Pursuant to advantageous specific embodiments of the present invention, the annular peripheral surfaces of the end of the belt reeling-in shaft located in the projection of the recessed portion may, with the exception of an interruption which allows the latching projections of the locking member to pass through, form a hub which is centrally disposed in that associated opening which is designed for arresting. The locking member, which is in the form of a flat stamped metal part, may be designed in the manner of a pendulum and may have an approximately upside-down T-shape. The latching projections may be disposed on one free end of the T-cross-member, and at least one abutment, for cooperation with a counter-abutment of the end of the belt reeling-in shaft, may be disposed on the other free end. The free end of the upright T-portion may, by means of appropriate widened portion, be designed as the pivot axis for the pivotable suspension of the pendulum-like locking member. The recessed portion of the end of the belt reeling-in shaft, which recessed portion is provided for receiving the locking member, may be contoured essentially in conformity to the contour of the locking member, with the spaces in which the ends of the cross-member of the locking member shift during the pivot movements of the latter being appropriately defined in a sector-like manner, and with a reduced-width portion being formed in the recessed portion for the pivotable suspension of the pendulum-like locking member.

The locking member, and the edges of the recessed portion of the end of the belt reeling-in shaft, may each be provided with at least two abutment surfaces; in particular, in each case at least one abutment surface is provided on each side of the belt reeling-in shaft, with a respective one of the abutment surface pairs cooperating in each of the two operating positions of the locking member. In the region of its latching projections, the locking member is provided with a pin which extends parallel to the axis of the belt reeling-in shaft, and which establishes the connection between the locking member and the mechanism, especially an inertial member, which controls the movements of the locking member.

The belt reeling-in shaft, on the side of the locking member, may be provided with a journal pin which passes through the recessed portion for the locking member, and which also passes through the locking member by means of an opening in the latter, so that the locking member overlaps and surrounds the journal pin; the opening in the locking member may be in the form of an elongated hole which permits the pendulum movements of the locking member in the recessed portion relative to the fixed journal pin.

The opening in the housing for that end of the belt reeling-in shaft which is opposite the locking member may be provided with a locking toothing over a sector-like portion. This toothing may have teeth which vary in depth, with the depth of the teeth in the middle of the sector being the greatest, and with those to the sides becoming increasingly flatter.

The belt reeling-in shaft may be an essentially cylindrical cast piece, with the diameter of the winding core for the belt strap, the diameter of the peripheral surface of the shaft end which is recessed for the locking member, and the diameter of the locking toothing found on the opposite side of the shaft coincide approximately with one another.

The journal pins disposed on both sides of the belt reeling-in shaft can be integrated into the cast shaft part, and the journal pin on the side of the rewinding spring may be provided with a receiving configuration, especially a slot, for the inner end of the spring.

The present invention has, among others, the advantage that the belt reel-in mechanism can be built-in not only on the right side but also on the left side of automobiles into the rear door-posts (B-columns) that are generally present at that location, since this reel-in mechanism permits adequately small dimensions and is suitable for both sides in the same manner. In particular, there results the advantage that the ability of the belt reel-in mechanism to function for the important high-load situation (crash), which often does not occur until many years after use, is reliably maintained, since the locking mechanism provided for this purpose cannot be adversely affected by the daily normal operation, inasmuch as a separate locking mechanism is provided for this type of operation.

Pursuant to one preferred embodiment of the present invention, that edge of the belt reeling-in shaft against which a corresponding edge of the locking member rests as an abutment after the locking member has deflected and engaged in arresting means associated with the housing, is provided with a shape which can be altered relative to the contact point by breaking off or being crushed, so that at that location there results a zone which is resilient within limits, and which regulates the final position of the locking member as a function of the forces encountered by the safety belt. In this arrangement, the yielding edge, via appropriate recesses, is formed by the material spikes which remain in the line of the edge between the recesses. Connected herewith is the effect that when high load and corresponding encroachment of the resilient or "soft zone" occurs, an enlargement of the angle can be achieved about which the locking member moves from its rest position into its locking position; at the same time, this results in a deepening and hence strengthening of the arresting action. Fundamentally, this concept of a soft zone to differentiate between two load conditions, and correspondingly different arresting intensities, can be realized in general not only with a belt reel-in mechanism having the initially mentioned features, but also with belt reel-in mechanisms of the so-called radial locking principle, at least everywhere where a locking member is deflected radially and has one of its edges come to rest against a reference edge of the associated shaft end or of an associated component which is connected to the belt reeling-in shaft. During normal operation, the soft zone permits a more rapid performance of the locking mechanism, especially during the return of the locking member into the rest position, because the path which the locking member must cover in both directions is kept shorter. Pursuant to a further preferred embodiment of the present invention, the belt reeling-in shaft is provided at both ends with journal pins, which are supported on both sides of the belt reel-in mechanism in bearing cups made of resilient material, so that within limits, the belt reeling-in shaft is radially displaceably disposed in the housing. In this arrangement, the bearing cups can at the same time be designed for receiving and covering functional parts of the belt reel-in mechanism, especially for receiving the rewinding spring, and for receiving and covering the control system for the locking member. Connected herewith is the effect that the transverse displacement of the belt reeling-in shaft which is possible when the belt strap is pulled, can be easily carried out due to the resilience of the material for the cups in which the journal pins of the shaft are supported, with the cups, for example, appropriately bending and/or deforming a little; i.e., they have a rubber-like character. Connected herewith is a considerable simplification of the construction.

Also this feature of mounting the shaft journals in bearing cups of resilient material for achieving a radial or transverse displaceability of the belt reeling-in shaft is not exclusively bound to the presence of all of the previously mentioned general features and further inventive features, but rather can also be realized in conjunction with a different construction of the locking member or the like while maintaining the advantages connected therewith.

DESCRIPTION OF PREFERRED EMBODIMENTS

Referring now to the drawings in detail, the belt reel-in mechanism comprises a U-shaped housing 10, which has a base 11 and two sides 12, 13; the belt reel-in mechanism further comprises a belt reeling-in shaft 14, a rewinding spring 15, and a self-locking mechanism 16, the so-called automatic mechanism. The outer sides of the housing sides 12, 13, and the components which appear there, are each covered and protected against external influences by an identical protective cover 17. Whereas the housing 10 is made of sheet steel, the belt reeling-in shaft 14 is made of cast metal (die cast metal), and the protective covers 17 are made of plastic.

Figure 3:
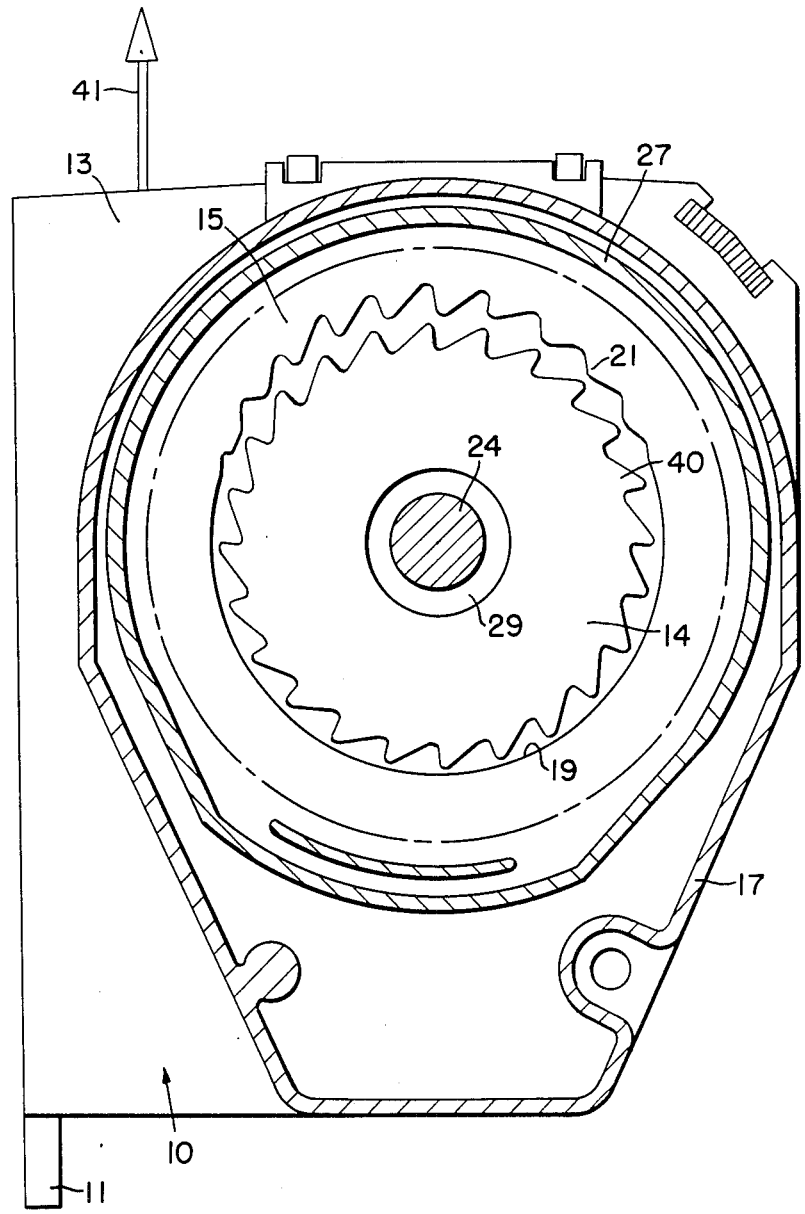
FIG. 3 is a cross-sectional view taken along the line III—III in FIG. 5, with the toothing at this end of the belt reeling-in shaft being in the non-arrested position.
Figure 4:
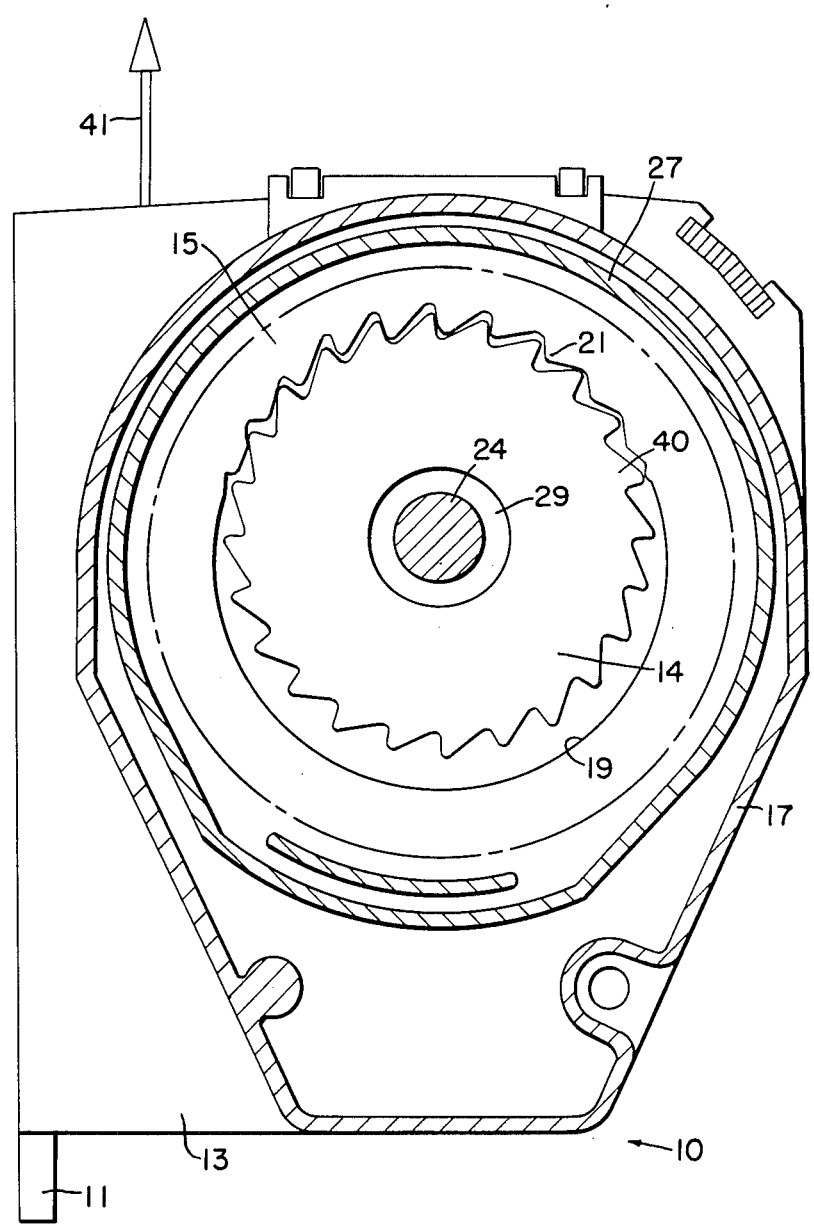
FIG. 4 is a view corresponding to that of FIG. 3, with the toothing arrested.
Figure 5:
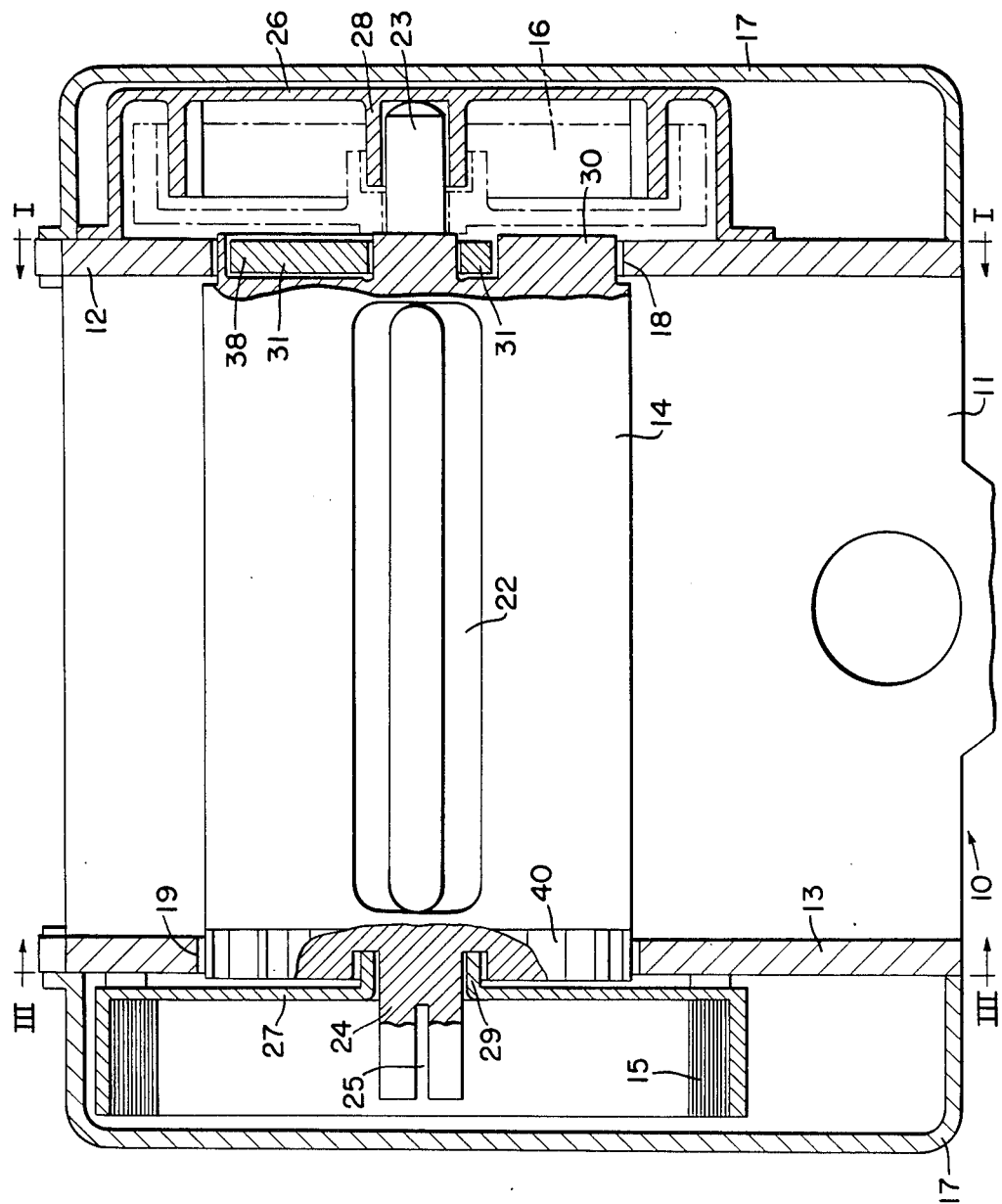
FIG. 5 is a view showing a partial longitudinal central section through the belt reel-in mechanism, and is taken along the line V—V in FIG. 1.

Each of the housing sides 12, 13 is provided with an essentially circular opening 18, 19 for the belt reeling-in shaft 14. The opening 18 has an internal toothing 20 which extends all the way around. The opening 19, on the other hand, as can be seen in FIGS. 3 and 4, only has a partial internal toothing, and in particular in the region of an upper sector, where there is disposed a toothing 21, the teeth of which are the deepest in the middle, and become continuously flatter toward the sides. The two ends of the belt reeling-in shaft 14 are mounted in the openings 18, 19 without touching the inner edges thereof as long as no particular circumstances exist. The shaft 14, which taken as a whole is essentially cylindrical, is provided in its central region with a mounting slot 22 for the end of the non-illustrated belt strap, and has at both ends axial journal pins 23, 24, with the pin 24 being provided with a transvetse slot 25 for receiving the inner end of the rewinding spring 15. Each of the journal pins 23, 24 is supported on a cup-shaped structural part 26, 27 of resilient material, especially plastic; the structural part 26 is provided for receiving the self-locking mechanism 16, and the structural part 27 is provided for receiving the rewinding spring 15. Each of the cup-shaped structural parts 26, 27 has a centrally disposed guide sleeve 28, 29 for receiving and guiding the associated journal pin of the shaft 14. Due to the resilience of the cup portions 26, 27, 28, 29, the shaft 14 can, when stress is applied, move radially in the housing 10 within certain limits, i.e. it can abandon its central position in the openings 18, 19.

The end 30 of the belt reeling-in shaft 14 at the side of the housing side 12 (FIGS. 1 and 2) has a special shape; in particular, it is embodied for receiving a locking member 31 in a countersunk or embedded manner, and for pivotable mounting of the locking member 31. For this purpose, the shaft end 30 is provided with a recessed portion 32 for the locking member 31; in particular, the recessed portion 32 is provided in such a way that the locking member 31 is flush with the plane of the housing side 12. In this arrangement, the journal pin 23 disposed on this side of the shaft 14 passes through an elongated hole 33 of the locking member, which is stamped, for example, out of sheet steel.

Figure 2:
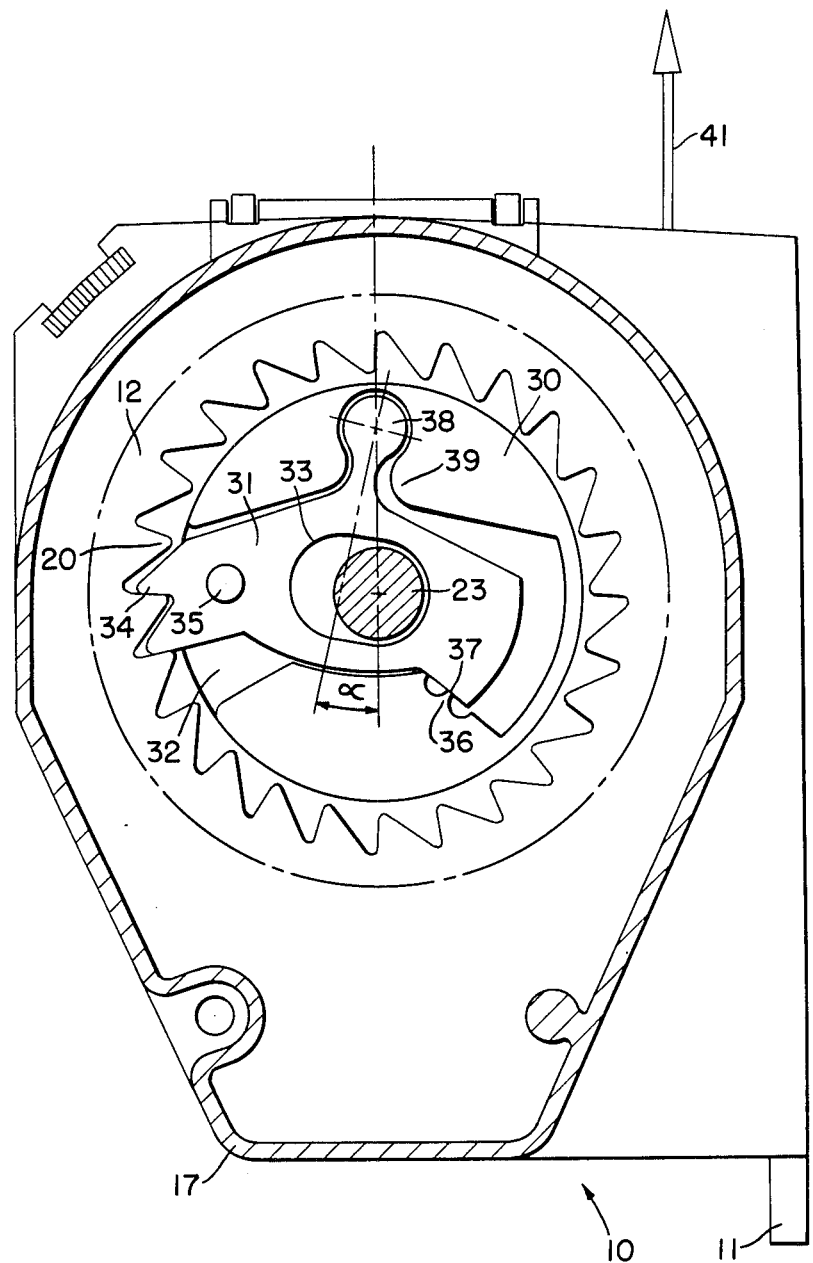
FIG. 2 is a view corresponding to that of FIG. 1, with the locking member being in a locking position.

Pursuant to FIGS. 1 and 2, the locking member 31 is embodied in the manner of a pendulum and has, expressed simply, the shape of an upside-down "T". It should be noted that the locking member constructed in this manner rotates with the shaft 14 and, in this manner, assumes all possible positions from a fixed point of observation, i.e. also appears as an upright or upside-down "T". However, due to the manner in which FIG. 1 is illustrated, an upside-down "T" position will be referred to here. Two locking teeth 34 are formed onto one free end of the T cross-member; in the event of locking, the locking teeth are intended to interlock with corresponding teeth of the internal toothing 20. On the side of the teeth 34 of the locking member 31, the latter is provided with a control pin 35 which projects from the locking member into the effective range of the automatic unit 16, which is not illustrated in detail; from there, the control pin 35 is controlled, i.e. the automatic mechanism 16 controls the movements of the locking member 31 via the pin 35. The particulars of this control are conventional.

Abutment surfaces are provided at the other free end of the cross-member of the T-shaped locking member 31; these abutment surfaces on the one hand limit the movements of the locking member in the recessed portion 32 of the shaft end 30, and on the other hand serve to transfer the locking forces from the belt strap, via the shaft 14, the locking member 31, and the teeth 34, 20, to the housing 10, and hence into the associated vehicle. Disposed opposite the abutment surfaces of the locking member 31 are conforming associated abutment surfaces of the shaft end 30, i.e. the circumferential edges of the recessed portion 32; of these, one abutment surface 36 is constructed in such a way that under certain circumstances it is a resilient or "soft" zone. The resilient or soft action of this abutment surface or zone occurs in that at that location there is provided a local construction which makes it possible for material to break off or become crushed when a strong enough pressure is exerted thereupon by the associated abutment surface 37 of the locking member 31. Pursuant to the embodiment of FIG. 1, provided in the surface section 36 are recesses, between which two material spikes remain which can be crushed when sufficient force is exerted. The result of this is that the locking member 31 can pivot further by a corresponding angular amount.

To provide for pivoting of the locking member 31, the free end of the upright T-member, by means of an appropriate widened portion 38, is in the form of a pivot axis for the locking member, i.e., in the position pursuant to FIG. 1, the locking member is pivotably suspended on the widened portion 38 in the manner of a pendulum. For this purpose, an appropriate reduced-width portion 39 is formed in the recessed portion 32 of the shaft end 30; the widened portion 38 is held in the reduced-width portion 39 without an additional mounting means for the locking member 31 in the recessed portion 32 being required.

On the side of the housing side 13, the shaft 14 is provided, in alignment with the opening 19, with an external toothing 40 (FIGS. 3 and 4); when the shaft 14 is radially displaced, the external toothing abandons its concentric position in the opening 19 and interlocks with the internal toothing sector 21. The position of the internal toothing sector 21, relative to its arrangement in the opening 19, conforms to the direction of pull on the belt strap, which is symbolized by the arrow 41 in FIGS. 1-4.

The described belt reel-in mechanism operates as follows: When the occupant of the vehicle has taken his place and wants to snap on the belt, he pulls it in the customary manner across his body and inserts the belt tongue into the buckle (not illustrated). In so doing, the belt is unwound from the shaft 14, and in particular, pursuant to FIG. 1, in the counter-clockwise direction (arrow 41). The locking member 31 assumes the position illustrated in FIG. 1, i.e. its teeth 34 remain within the contour of the shaft end 30. This position of the locking member 31 is the result of a corresponding control on the part of the self-locking mechanism 16, which pivots the pin 35 inwardly. The external toothing 40 at the other end of the shaft remains concentric in the opening 19 and does not contact the external toothing sector 21. The rewinding spring 15 is tensioned. In the event that the strapped-in occupant bends forward on his seat without any particular acceleration, nothing changes in this position of the components, and the occupant can pull the belt strap further out of the belt reel-in mechanism. When the occupant leans back again, the spring 15 appropriately rewinds the belt onto the shaft 14.

If during the trip a circumstance arises which either leads to a rapid withdrawal of the belt from the reel-in mechanism, with the occupant being jerked forward, or which activates the vehicle-sensitive system of the automatic mechanism 16, the locking member 31 is deflected via the control pin 35; in particular, in FIG. 1 the locking member 31 moves to the left, being pivoted clockwise about the widened portion 38. In so doing, the teeth 34 leave the contour of the shaft 14 and engage the closest teeth of the internal toothing 20. As a result, the abutment 36 of the recessed portion 32 comes to rest against the abutment 37 of the locking member 31; at the same time, the journal pin 23 in the elongated hole 33 moves from one side to the other. The shaft 14 is now locked relative to the housing 10, and it is impossible to pull the belt out any further. The strapped-in occupant is restrained by the belt.

In such a normal situation, the force which occurs in addition to the torque in the direction in which the belt is pulled, with relatively little load, is absorbed by the journal pins 23, 24 at both ends of the shaft 14 via the bearing cups 26, 27. The full diameter of the belt reeling-in shaft 14 is maintained to a maximum extent, i e. only that exit opening of the recessed portion 32 provided for the teeth 34 of the locking member 31 interrupts the diameter at this location.

If an accident occurs, especially a collision (crash), and hence a load limit of the belt is exceeded, the two bearing sections 26, 27, 28, 29 yield elastically or even by being destroyed, and the belt reeling-in shaft 14 and the outer periphery of the belt reeling-in shaft 14, in the direction of belt pull on the side of the locking member 31, rests against the internal toothing 20 of the housing, whereas the externally toothed end 40 of the shaft 14, on the side of the housing side 13 and the spring 15, engages the partial toothing 21 and conducts half of the torque of the shaft 14 into the housing 10. As long as the load persists, the locking member 31 always engages the toothing 20. As the belt pull increases, the shaft 14 yields at that surface 36 which receives the torque by braking or being crushed, and allows the teeth 34 to penetrate even deeper into the toothing 20. In other words, the pivot angle alpha of the locking member 31 increases as a result of the aforementioned soft zone of the shaft 14, and thus assures a maximum overlap of the associated teeth.

The present invention is, of course, in no way restricted to the specific disclosure of the specification and drawings, but also encompasses any modifications within the scope of the appended claims.

What I claim is:

1. A self-locking belt reel-in mechanism for safety belts; said mechanism has a housing, and a belt reeling-in shaft having a full circular-shaped solid cross section which is mounted therein in such a way that it cannot be displaced axially, but can be displaced radially after arresting engagement and under the effect of locking forces without any synthetic material thrust-collar bearing aid; the ends of said belt reeling-in shaft extend through respective openings of said housing, and are each provided, in the plane of its opening, with an arrangement which provides for the arresting of said belt reeling-in shaft; one of these arresting arrangements engages a fixed internal toothing of one of said openings of said housing when locking forces occur which do not exceed a predetermined value, and when locking forces occur which exceed the last-mentioned locking forces, both of said arresting arrangements engage a respective fixed internal toothing of their opening of said housing, so that arresting, and hence locking, of said belt reeling-in shaft results either at one end or at both ends of the latter; the improvement therewith wherein:

to form a first one of said arresting arrangements, one of said ends of said belt reeling-in shaft is provided with a hub effective in the full circular-shaped solid cross section including therewith a recessed portion in which is disposed a locking member; the depth of said recessed portion is such that said locking member is flush relative to the plane of the associated opening of said housing; said locking member is pivotably mounted in said recessed portion, eccentrically relative to said belt reeling-in shaft, and is provided with tooth-like latching projections to effect said engagement with said internal toothing of the assoicated opening of said housing; and to form the other of said arresting arrangements, the associated end of said belt reeling-in shaft is provided with a peripheral toothing, which is flush with the plane of the associated opening of said housing, to effect said engagement with said internal toothing of said associated opening of said housing; that end of said belt reeling-in shaft associated with said first arresting arrangement being provided with an annular peripheral surface located in the projection of said recessed portion; with the exception of an interruption which allows said latching projections of said locking member to pass through, said peripheral surface forming said hub which is centrally disposed in that associated opening of said housing designed for engaging said first arresting arrangement.

2. A belt reel-in mechanism according to claim 1, in which said locking member is in the form of a flat, stamped, metal part which is designed in the manner of a pendulum and has a T-shape, including a T cross-member and an upright T portion; said latching projections are provided on one of the free ends of said T cross-member, and the other free end thereof is provided with at least one abutment for cooperation with a counter-abutment on the associated end of said belt reeling-in shaft; that end of said upright T portion remote from said T cross-member is provided with a widened portion to form the pivot axis for said pivotable mounting of said pendulum-like locking member in said recessed portion.

3. A belt reel-in mechanism according to claim 2, in which said recessed portion, which is provided in said one end of said belt reeling-in shaft for receiving said locking member, is essentially contoured in conformity with the contour of said locking member; said recessed portion is provided with spaces which accommodate the ends of said T cross-member and allow displacement movements thereof during pivotal movements of said locking member; said spaces are appropriately defined in a sector-like manner; said recessed portion is further provided with a reduced-width portion for accommodating said widened portion of said upright T portion of said locking member to effect said pivotable mounting.

4. A belt reel-in mechanism according to claim 2, in which said locking member and the edges of said recessed portion of the associated end of said belt reeling-in shaft are each provided with at least two abutment surfaces, in each case at least one on each side of said shaft, with a respective one of pairs of said abutment surfaces cooperating in the two operating positions of said locking member.

5. A belt reel-in mechanism according to claim 2, which includes a mechanism for controlling the movements of said locking member; and in which said locking member, in the vicinity of its latching projections, is provided with a pin which extends parallel to said belt reeling-in shaft, and establishes the connection between said locking member and said last-mentioned control mechanism.

6. A belt reel-in mechanism according to claim 1, in which said internal toothing for that arresting arrangement at that end of said belt reeling-in shaft remote from said locking member extends over a sector-like portion of the associated opening of said housing.

7. A self-locking belt reel-in mechanism for safety belts; said mechanism having a housing, and a belt reeling-in shaft which is mounted therein in such a way that it cannot be displaced axially, but can be displaced radially under the effect of locking forces; the ends of said belt reeling-in shaft extending through respective openings of said housing, and each being provided, in the plane of its opening, with an arrangement which provides for the arresting of said belt reeling-in shaft; one of these arresting arrangements engaging a fixed internal toothing of one of said openings of said housing when locking forces occur which do not exceed a predetermined value, and when locking forces occur which exceed the last-mentioned locking forces, both of said arresting arrangements engaging a respective fixed internal toothing of their opening of said housing, so that arresting, and hence locking, of said belt reeling-in shaft results either at one end or at both ends of the latter; the improvement therewith wherein:

to form a first one of said arresting arrangements, one of said ends of said belt reeling-in shaft is provided with a recessed portion in which is disposed a locking member; the depth of said recessed portion being such that said locking member is flush relative to the plane of the associated opening of said housing; said locking member being pivotally mounted in said recessed portion, eccentrically relative to said belt reeling-in shaft, and being provided with tooth-like latching projections to effect said engagement with said internal toothing of the associated opening of said housing; and to form the other of said arresting arrangements, the associated end of said belt reeling-in shaft being provided with a peripheral toothing, which is flush with the plane of the associated opening of said housing, to effect said engagement with said internal toothing of said associated opening of said housing; that end of said belt reeling-in shaft associated with said first arresting arrangement being provided with an annular peripheral surface located in the projection of said recessed portion; with the exception of an interruption which allows said latching projections of said locking member to pass through, said peripheral surface forming a hub which is centrally disposed in that associated opening of said housing designed for engaging said first arresting arrangement; said locking member being in the form of a flat, stamped, metal part which is designed in the manner of a pendulum and having a T-shape, including a T cross-member and an upright T portion; said latching projection being provided on one of the free ends of said T cross-member, and the other free end thereof being provided with at least one abutment for cooperation with a counter-abutment on the associated end of said belt reeling-in shaft; that end of said upright T portion remote from said T cross-member being provided with a widened portion to form the pivot axis for said pivotable mounting of said pendulum-like locking member in said recessed portion;

that end of said belt reeling-in shaft which is provided with said locking member being provided with a first journal pin which passes through said recessed portion, and also passes through a hole in said locking member, so that the latter overlaps and surrounds said first journal pin; said hole in said locking member being an elongated hole which permits pendulum movements of said locking member, in said recessed portion, relative to said fixed first journal pin.

8. A belt reel-in mechanism according to claim 7, which includes a second journal pin at that end of said belt reeling-in shaft remote from said locking member; and which includes, for supporting each of said journal pins, a respective cup-shaped support member which is made of resilient material and is associated with said housing, so that said belt reeling-in shaft is disposed in said housing in such a way as to be radially displaceable within limits.

9. A belt reel-in mechanism according to claim 8, which includes a control system for said locking member, and a rewinding spring; and in which said cup-shaped support members accommodate said spring, and accommodate and cover said control system.

10. A belt reel-in mechanism according to claim 8, in which said belt reeling-in shaft is an essentially cylindrical cast part having a winding core for said belt, with the diameters of said winding core, of the peripheral surface of that end which is recessed for receiving said locking member, and of said peripheral toothing of that end of said shaft remote from said locking member, approximately coinciding with one another.

11. A belt reel-in mechanism according to claim 10, in which said first and second journal pins of said belt reeling-in shaft are integrated into said cast shaft part; and which includes a rewinding spring, with said second journal pin being provided with means for receiving the inner end of said spring.

* * * * *